Feb. 7, 1933. G. C. BURD 1,896,285
TUBULAR CASING
Filed March 25, 1930
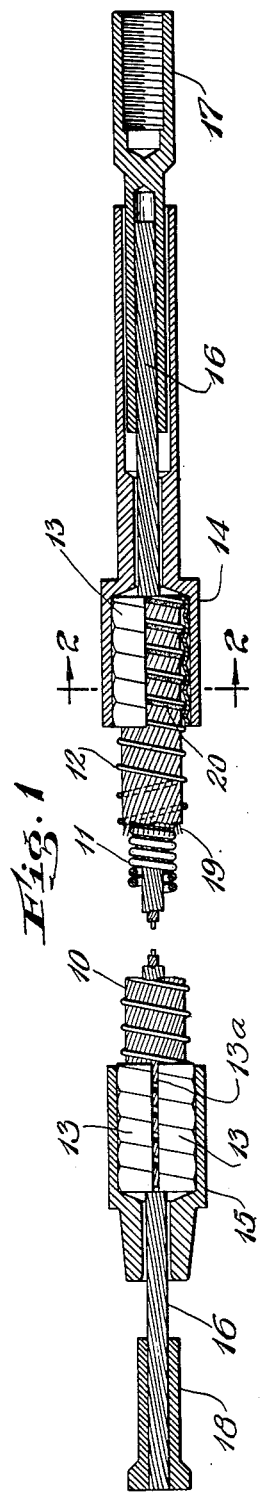
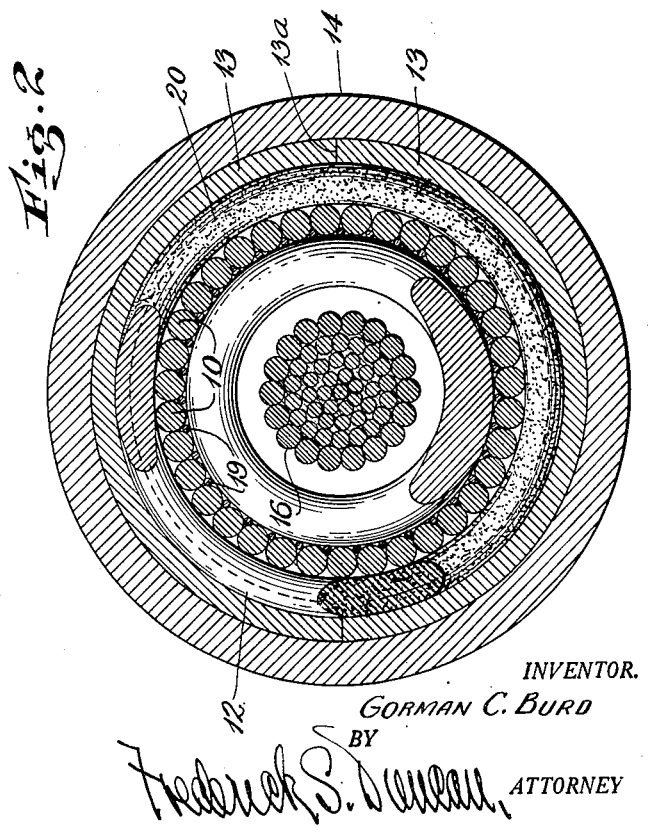
INVENTOR.
GORMAN C. BURD
BY
Frederick S. Duncan, ATTORNEY

Patented Feb. 7, 1933

1,896,285

UNITED STATES PATENT OFFICE

GORMAN C. BURD, OF ADRIAN, MICHIGAN, ASSIGNOR TO AMERICAN CABLE COMPANY, INC., A CORPORATION OF DELAWARE

TUBULAR CASING

Application filed March 25, 1930. Serial No. 438,917.

The present invention relates to tubular casings of the type that are built up of helically wound metal wires, using the latter term in its generic sense to include strips of various cross-sections, and the general object of the invention is to provide a conduit of the above type which will be proof against leakage of lubricant or other liquid or plastic materials.

The present invention is of particular utility when embodied in the construction of flexible casings to receive the operating cables for automobile brakes which must be installed in a manner that permits pivotal movement of the wheels in steering. To reduce friction with the cable in the casing, it is desirable to fill the latter with a lubricant and it is an object of the present invention to provide means for preventing escape of the lubricant from between component parts of the casing.

Another object of the invention is to provide means for preventing leakage between the body of the casing and fittings applied thereon. Other objects and advantages of my invention will appear in the following description of a preferred embodiment and thereafter the novelty and scope of the invention will be pointed out in the claims.

In the accompanying drawing;

Figure 1 is a side view of a brake cable and casing with certain parts broken away and other parts shown in section; and Figure 2 is a view in cross-section and on an enlarged scale, the section being taken on the line 2—2 of Fig. 1, after the fitting at that point has been subjected to a swaging process.

The tubular casing shown in the drawing comprises an envelope composed of a multiplicity of longitudinally disposed wires 10 laid helically and with a relatively long pitch. This envelope is mounted between an inner support 11 and an outer support or retainer 12. The inner support consists of a helically coiled wire which is wound with a slight spacing between the coils. The outer support is also composed of a spirally coiled wire, but with the coils thereof widely spaced apart.

The casing is provided on each end with a corrugated bushing 13 fitted thereon. The bushing is spirally corrugated so as to fit over and between the coils of the support 12. Fitted tightly over the bushing 13 at one end of the casing is a fitting 14 and similarly at the opposite end of the casing a fitting 15 is fitted tightly over the bushing 13. These fittings are adapted to be swaged on the casing so as to be permanently secured thereto and to press the bushings 13 into engagement with the envelope 10. In other words, the coil 12 is not solely relied upon to hold the fitting on the casing. The bushings 13 are preferably formed of two semi-cylindrical sections. Gaps 13a separate the bushing sections when they are applied, but after swaging, these gaps are tightly closed, as indicated in Fig. 2.

Passing through the casing and the two fittings is a brake operating cable 16 which is provided at one end with a fitting 17 and at the other end with a fitting 18.

The casing is adapted to be filled with grease and in forcing the grease into the casing there would be a tendency for it to ooze out between the wires of the envelope 10. To prevent this I provide cords 19, of cotton or other suitable material which are laid against the inner wall of the envelope in the depressions formed between the wires 10. The cords are held in place by the inner supporting coil 11 and serve as a packing to calk the joints between the wires and to hold the grease in the envelope. There is also a tendency for the grease to flow out between the bushing 13 and the outer wall of envelope 10. When the fittings are swaged the bushing 13 is pressed into close engagement with the envelope 10, but it is impossible to obtain so tight a fit that there will not be a helical opening running along the coils 12 through which the grease may be forced. To prevent such leakage, I provide at each end of the casing a cord 20 which is wound about the casing between the coils of the inner support 12. This provides a packing which closes the helical opening between the bushing and the envelope 10.

Having thus described my invention, what

I claim as new and desire to secure by Letters Patent is as follows:

1. A tubular casing formed exteriorly with a helical rib, a sleeve fitted upon one end of the casing, and a flexible packing within said sleeve and solely between the coils of the rib to calk the joint between said sleeve and the casing.

2. A tubular casing formed exteriorly with a helical rib, a bushing fitted on one end of the casing over the helical rib, a flexible packing within the bushing and between the coils of the rib, and a member having a socket portion in which the bushing is fixed.

3. A tubular casing comprisng an envelope formed exteriorly with a helical rib, a bushing on one end of the casing, said bushing being helically corrugated to fit over and between the coils of the rib, a flexible packing adapted to calk the joint between the bushing and the envelope, and a member having a socket portion in which the bushing is secured.

4. A tubular casing formed exteriorly with a helical rib, a sleeve fitted upon one end of the casing, and a flexible packing within said sleeve and between the coils of the rib, said packing extending through more than one full turn of the rib to caulk the joint between said sleeve and the casing.

5. A tubular casing formed exteriorly with a helical rib, a sleeve fitted upon one end of the casing, and a flexible packing in the form of a cord wound about the casing within the sleeve and between the coils of the rib to caulk the joint between said sleeve and the casing.

In testimony whereof, I have signed this specification.

GORMAN C. BURD.